Feb. 18, 1969  J. DELMONTE  3,427,884
DIFFERENTIAL PRESSURE TRANSDUCER
Filed Dec. 23, 1966

INVENTOR.
JULIAN DELMONTE
By
Miketta, Glenny, Poms & Smith
ATTORNEYS.

United States Patent Office 3,427,884
Patented Feb. 18, 1969

3,427,884
DIFFERENTIAL PRESSURE TRANSDUCER
Julian Delmonte, La Canada, Calif., assignor, by mesne assignments, to Whittaker Corporation, Los Angeles, Calif.
Filed Dec. 23, 1966, Ser. No. 604,215
U.S. Cl. 73—398
Int. Cl. G01l 7/08, 9/04
12 Claims

ABSTRACT OF THE DISCLOSURE

A diaphragm element having a flexible tubular support wall or section and a thin flexible diaphragm that extends transversely across the support wall and is exposed at either side to a pressure medium. The diaphragm and the wall are so proportioned and arranged that a differential prseure across the diaphragm in a selected or operating range will flex the diaphragm and will also flex or bend and thus stress the support wall. The stress, which is in proportion to that pressure differential, is sensed at the exterior of the support wall.

Background of the invention

Devices for determining differential pressure between two mediums are widely used in our modern technology. In addition to high accuracy, sensitivity and dependability, it is increasingly important to reduce size and weight while maintaining a control on cost. One type of simplified pressure differential transducer or measuring device commonly used utilizes a pressure diaphragm which is exposed at its opposite faces to pressure mediums exerting pressures $P_1$ and $P_2$ respectively. The diaphragm will be flexed or bent one way or the other by the difference in pressure between $P_1$ and $P_2$ which may be designated $\Delta P$. The stress on the diaphragm may be sensed by suitable means including sensors such as strain gages that may be secured to one or both faces of the diaphragm; the stress in the flexed diaphragm is proportional to the differential pressure so that the sensing means provides an information signal or output proportional to that differential pressure to an indicator, recorder or control or monitoring mechanism. However, some pressure medium would be damaging to or adversely affect the operation of the sensors or strain gages if the sensors were directly exposed to the medium. For example, a liquid medium may tend to impair the operation and/or useful life of the sensors as by breaking down the bonding of the sensors to the diaphragm or adversely affecting the sensors themselves. Thus, in a "wet-wet" application, i.e., where both mediums are liquid, the sensors cannot be satisfactorily mounted on either of the diaphragm surfaces. Various attempts have been made to solve this problem but they have not been satisfactory; there has not been an effective and dependable arrangement which was also simple and economical. Arrangements attempting to cover or insulate the sensors may leak, or may adversely affect the movement of the diaphragm; further lead wires must also be covered or insulated. Hollow diaphragms for housing the sensors are obviously difficult and costly to manufacture and assemble and they may tend to deflect non-uniformly to changes in differential pressure. Similarly, mechanisms or linkages placed between the diaphragm and remotely positioned sensing means add to the complexity and cost of the devices. Further such prior art devices have been relatively bulky and heavy, which is undesirable for many applications.

In the exemplary form of the device shown in the drawings, the exterior of the support wall is a smooth and continuous cylindrical surface which is easy and economical to machine and makes the element compact and easy to assemble and disassemble. When the diaphragm and the wall are flexed, compression occurs in the wall adjacent to the higher pressure side of the diaphragm while tension occurs adjacent to the lower pressure side of the diaphragm. The construction, proportioning and arrangement of the diaphragm and of the support wall to effect bending in the wall rather than axial tension or compression is an important feature of the present invention. The prior art included devices which superficially appeared similar in construction to applicant's element, i.e., having a cylindrical wall combined with a transverse wall. However, such prior devices were so constructed and proportioned as to constitute different structure which operated in a different manner to produce different results. While such prior devices attempted to measure differential pressure across the transverse wall, they did not involve flexing or bending a wall or portion but rather utilized tension or compression of a wall in its own plane. In such devices the transverse wall was a rigid and non-flexible plate which did not flex for the range of differentials pressures at which the device was designed to operate. A pressure differential across the rigid plate tended to axially or longitudinally stretch or tension the tubular wall at the high pressure side of the plate while longitudinally compressing the tubular wall at the low pressure side of the plate. The tubular shape of the wall offered high resistance to such axial tension and compression so that the device had quite low sensitivity. Further, such devices exhibited relatively high sensitivity to line pressure effect. Thus, the present invention which achieves its high sensitivity by utilizing bending and utilizes structure adapted to achieve that bending is a marked deviation and improvement over such rigid low sensitivity prior art devices which utilized structure designed to minimize bending or flexing.

Summary of the invention

The present invention relates generally to a differential pressure transducer. It relates more particularly to a simplified, compact and economical form of such a transducer utilizing flexure or bending in a thin flexible diaphragm and in a flexible wall supporting the diaphragm around its periphery to accurately determine the differential pressure across the diaphragm. The resultant strain produced at an outer surface of the support wall by the bending is measured or sensed, whereby the sensing means is isolated from the pressure-producing medium.

It is an object of the present invention to provide a novel and improved differential pressure transducer. It is another object to provide a novel and improved diaphragm element for such a transducer. It is also an object to provide a novel improved method for determining differential pressure.

It is another object of the present invention to utilize bending of a tubular outer support wall connected to a flexible transverse diaphragm to determine differential pressure across the diaphragm.

It is a further object of the present invention to provide such apparatus and method involving high sensitivity to differential pressure and low sensitivity to line pressures.

It is a further object of the present invention to provide such a diaphragm element which is compact, simple and economical to manufacture, install and service, and durable and dependable in operation.

Other objects and advantages of the present invention will become more apparent from the following description and the associated drawings.

Brief description of the drawing

FIGURE 6 is a diagrammatic representation (exaggerated for purposes of illustration) of the deflection of the diaphragm element subjected to equal line pressures $P_1$ and $P_2$.

*Description of the preferred embodiment*

Figure 2:
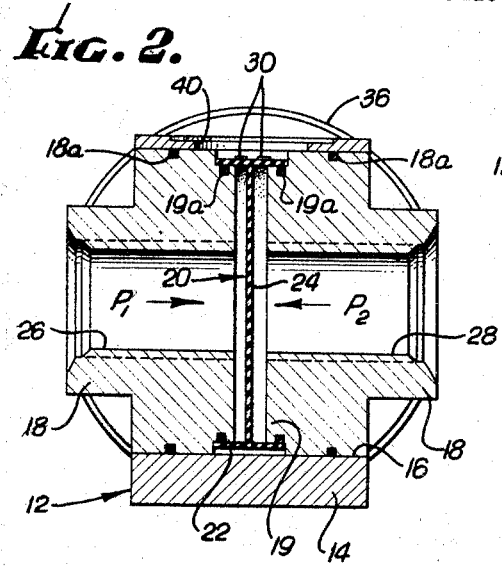
FIGURE 2 is a sectional view taken generally along the plane shown by line II—II on FIGURE 1.
Figure 1:
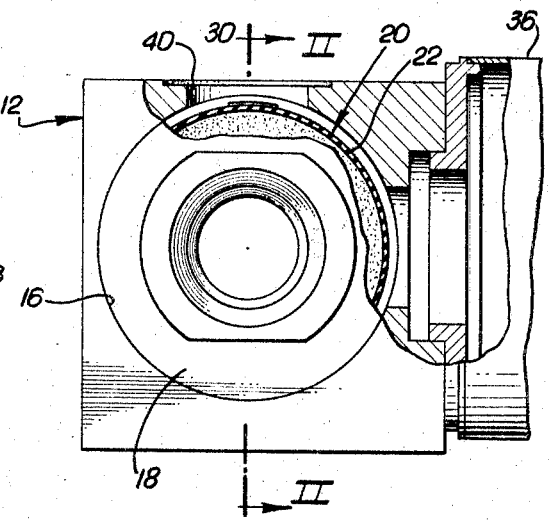
FIGURE 1 is a partial side view with portions broken away of a differential pressure transducer embodying various features of the present invention.

In general, illustrated transducer includes housing means 12 for holding a diaphragm element 20. The element 20 has a flexible tubular support wall or section 22 and a flexible transverse diaphragm 24 supported across the support wall. The housing means 12 includes a pair of pressure ports 26, 28 that place opposite sides of the diaphragm 24 in direct communication with liquid medium under pressures $P_1$ and $P_2$ respectively. A differential pressure $P_1-P_2$ in a selected range flexes the diaphragm 24 to measurably bend the support wall 22 in proportion to the differential pressure. Sensing means, including sensors such as strain gages 30 mounted on the outside of the tubular support wall 22, sense the tension and/or compression in bending of the support wall to determine the differential pressure $P_1-P_2$ across the diaphragm.

The transducer is shown with the diaphragm generally vertical and it will be described in that orientation as a matter of convenience. It will be appreciated however that it may be oriented in other selected manners such as with the diaphragm horizontal or at an incline.

As noted above, the illustrated diaphragm element 20 is constructed and proportioned so that when exposed to differential pressure in its operating range the diaphragm 24 will flex and produce bending and thus measurable strain in the support wall 22. The diaphragm element 20 may be constructed of a suitable flexible material, such as titanium, which is preferably strong, durable and corrosion-resistant. It may be an integrally formed unitary part or it may be fabricated from two or more pieces or sections suitably secured together as by brazing or welding. The tubular support wall 22 is illustrated in a cylindrical form with the diaphragm 24 being generally normal to the wall and centered between the ends of the wall. The support wall may if desired take selected forms other than cylindrical such as polygonal. The wall is preferably symmetrical for simplicity (which reduces costs of manufacture, assembly and servicing) and to reduce line effects as will be explained. The support wall might for example be formed as a pair of frusto-conical sections tapering radially outwardly or inwardly in either axial direction from the diaphragm or as some other selected form or configuration. Similarly, while it appears desirable that the diaphragm be positioned symmetrically with regard to the support wall, its position may be selectively varied if desired. The proportioning of the wall and the diaphragm should be such for the particular material of the element that, in the range of line pressures and differential pressures at which the element is to operate, the diaphragm will flex or bend in response to pressure differentials across it and thereby cause bending and resultant measurable or determinable strain in the support wall. The diaphragm may be thin relative to the thickness of the support wall as compared to devices wherein it is desirable to limit or restrict bending in a diaphragm and in adjacent walls. As noted above, the support wall has a continuous uninterrupted outer surface which contemplates the absence of protrusions or projecting portions or sections; this facilitates the ready and economical manufacture and assembly of the element.

The flexing or bending of the diaphragm and of the wall referred to herein contemplate what may be termed a significant or substantial amount of deflection or distortion out of the plane of the respective member in view of the objective or purpose of such bending, i.e., to produce a measurable strain at the surface of the wall. Such a strain should be readily measurable by the nature or kind of strain gage customarily or commonly used commercially to measure strain in similar devices; it would not be considered measurable or readily measurable as the terms are used herein simply because ultra-sensitive devices or instruments may be available which could measure such strain. To provide a commercially practical or feasible product, the strain must be capable of measurement by commercially available devices or gages whose costs is generally compatible with the cost of such transducers. On the other hand, the flexing or bending contemplated would normally be quite small in relation to the dimensions of the flexing member, for example being substantially less than the thickness of the member.

The housing means 12 supports the element 20 in a manner permitting the desired movement or bending of the diaphragm 24 and the support wall 22 incident to the pressure differential across the diaphragm. The housing means may be constructed of any suitable material such as steel or aluminum. In the exemplary embodiment, the housing means 12 includes a rectangular casing or housing 14 having a cylindrical bore 16 in which the diaphragm element 20 is supported. A pair of cylindrical end bells or supports 18, which each extend inwardly from one end of the bore 16, support the diaphragm element 20 between them and are secured to the casing 14 as by means of a brazed ring indicated at 18a. In the exemplary embodiment, the inward ends of the end supports 18 are spaced apart and provided with reduced diameter hubs or means 19. Each hub 19 is adapted to receive thereon one end of the tubular support wall 22 of the diaphragm element, with the end of each hub spaced from the diaphragm 24 to form a pressure chamber or cavity extending over the entire surface of the diaphragm. This serves to distribute the differential pressure $P_1-P_2$ over the entire diaphragm. The tubular support wall 22 may be secured adjacent each of its ends to the respective end supports 18 as by means of a brazed ring indicated at 19a. Each end support 18 defines one of the pressure ports 26, 28 coaxially therethrough and in communication respectively with the pressure chambers at either side of the diaphragm. The pressure ports 26, 28 are adapted to be connected by suitable means (not shown) to the respective liquid medium under pressures $P_1$ and $P_2$ respectively. The brazed connection 19a provides a seal between the element and the end supports 18 to separate or isolate the pressure chambers from the sensors on the outer surface of the support wall.

Figure 5:
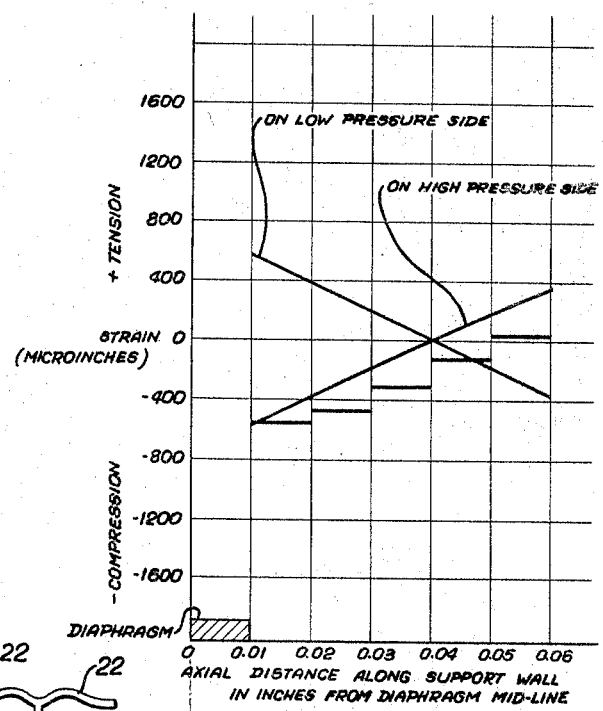
FIGURE 5 is a graph illustrating the variation in strain in the tubular support wall of the transducer along the length of the wall.

It has been demonstrated experimentally that, using the illustrated configuration and selected dimensions for a diaphragm element and operating within a selected or predetermined range of line pressures and pressure differential associated with that element, compression will occur at the outside of the tubular support wall immediately to the higher pressure side of the diaphragm and tension will occur at the outside of the wall immediately to the lower pressure side of the diaphragm. It has further been demonstrated that this compression and tension first diminish and then change to tension and compression respectively progressing axially away from the diaphragm in opposite directions along the wall. The graph of FIG. 5 illustrates the strain at the outer surface of the tubular support wall at either side of the diaphragm plotted against the axial distance in inches along the support wall starting at the midpoint of the diaphragm. It will be noted that the largest values of strain take place immediately adjacent the diaphragm.

In FIG. 5 the curves represent calculated values while the bars represent measured strain. For the transducer under consideration: Young's modulus (E) was $28.5 \times 10^6$ p.s.i.; diaphragm thickness was 0.020 inch and diaphragm diameter was 1.00 inch; support wall length (from the middle plane of the diaphragm to outer end of support wall) was 0.060 inch and the support wall thickness was 0.010 inch; and $P_1$ was 44.7 p.s.i. and $P_2$ was 14.7 p.s.i. for a p.s.i.d. of 30. For clarity, only the measured strain for the higher pressure side is shown in FIG 5.

Figure 3:
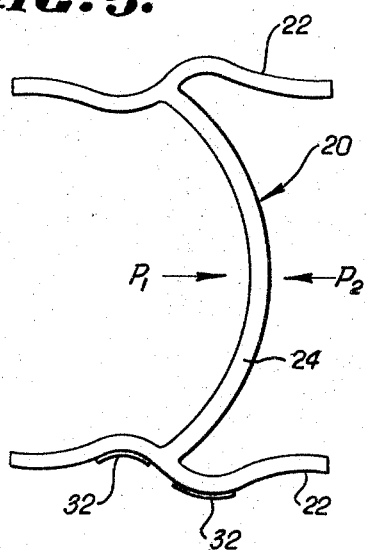
FIGURE 3 is a diagrammatic representation (exaggerated for purposes of illustration) of the deflection which takes place in the tubular support wall and diaphragm of the diaphragm element of the illustrated transducer subjected to a differential pressure $P_1-P_2$.

From the foregoing experimental results as well as from theoretical calculations, it appears that the diaphragm element, when subject to $P_1$ and $P_2$ (with $P_1 > P_2$), distorts or defects generally as represented in FIGURE 3, although that figure greatly exaggerates the distortion for purposes of illustration, the actual amount of distortion being very small in relation to the dimensions of the structure. Also, the relative distortions as between the diaphragm, the tubular support wall, and various portions thereof are represented only as a matter of illustration to facilitate an understanding of the structure and its operation. Thus, in general, the diaphragm 24 will tend to bow or curve with its center being pushed furthest from the higher pressure side. This in turn tends to produce a bending or flexing of the tubular support wall 22. Directly adjacent the diaphragm, the wall 22 at the higher pressure side of the diaphragm tends to bend or curve radially inwardly to place its outer surface in compression; the wall at the lower pressure side of the diaphragm tends to bend or curve radially outwardly to place its outer surface in tension. The tension and compression produced by this bending is directly related or proportioned to the pressure differential $P_1 - P_2$ so that by sensing the tension and/or compression, that pressure differential is determined by the transducer.

The sensitivity of the illustrated transducer and the diaphragm element are relatively high. For a given pressure differential there is a substantial amount of tension and/or compression produced because the support wall tends to flex or bend rather than to attempt to stretch or compress in its own plane. This permits accurate measurement and control of the pressure differential.

Figure 4:
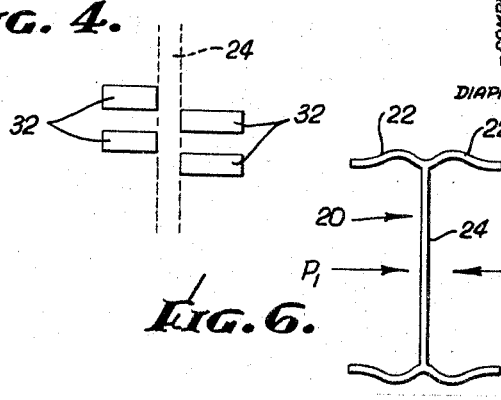
FIGURE 4 is a diagrammatic representation of the arrangement of strain gages on the tubular support wall of the element.

The stress or strain produced at the outer surface of the support wall may be sensed by any suitable means. The sensing means of the exemplary embodiment includes the semiconductor strain gages 30 secured to that outer surface with their active portions 32 in an arrangement such as shown in FIGURE 4. The gages 30 operate to measure the average strain over the length of their active portions 32. Two of the gages 30 may be positioned with their active portions 32 extending axially outwardly from the plane of one surface of the diaphragm and two of the gages may be positioned with their active portions extending axially outwardly from the plane of the other surface of the diaphragm. The gages 30 may be connected in a suitable balanced closed Wheatstone bridge circuit arrangement with the resultant electrical output being directly proportional to the differential pressure $P_1 - P_2$ to give a direct reading of $P_1 - P_2$ or to operate or monitor controls in various systems.

In the exemplary embodiment, the strain gages 30 may be connected as by means of suitable leads (not shown) to suitable circuitry or electronics (not shown) of the transducer which may be housed primarily in a cylindrical casing section 36 mounted on one side of the casing 14. A sealable transverse access port 40 is provided in the casing 14 adjacent the strain gages 30 to permit the gages to be secured to the wall of the diaphragm element 20 after the element and end supports 18 have been secured in place in the casing.

As noted generally above, the symmetrical configuration of the diaphragm element 20 tends to minimize line pressure effects on the differential pressure readings of the transducer. FIGURE 6 is an exaggerated diagrammatic representation of the effect of substantial but equal pressures $P_1$ and $P_2$. In general, the diaphragm 24 will not be bowed or flexed in either direction but the tubular support wall 22 at either side of the diaphragm will tend to bow radially outwardly. Since the pressures $P_1$ and $P_2$ are equal and the wall 22 is generally symmetrical, the amount of bowing or bending and thus the stress in the outer surfaces of the wall at each side of the diaphragm will tend to be generally the same. This will tend to balance or cancel out in the Wheatstone bridge circuit so as to minimize distortion to the output of the sensing means measuring the pressure differential across the diaphragm.

It appears that a diaphragm element of the general configuration shown in the drawings will operate effectively at differential pressures of at least up to ±200 p.s.i.d. Such an element may have various specific selected dimensions, the relative values of the dimensions being of principal importance. Thus, a desirable diaphragm may have a diameter of from about 0.5 to about 2.0 inches and a thickness of from about 0.010 to about 0.060 inch, while the support wall may have a thickness of from about 0.003 to about 0.020 inch. The element is desirably generally proportionate in that the larger is one such dimension, the larger are the other such dimensions, e.g., when the wall thickness is at the top of its range of values, the diaphragm thickness and diameter will preferably be at or near the top of their respective ranges of values.

By way of example, diaphragm elements having the dimensions shown in the following Table I have been used to effectively determine pressure differentials of the respective values indicated. The support wall has an I.D. of 1.000 inch and the support wall length is measured from its outer end to the plane of the nearest face of the diaphragm. The diaphragm thickness is .0200 inch.

TABLE I

| Differential Pressure Capability, p.s.i.d. | Support Wall Thickness, inch. | Support Wall Length, inch. |
| --- | --- | --- |
| ±15 | .0040 | .1150 |
| ±25 | .0055 | .1150 |
| ±50 | .0100 | .1150 |
| ±100 | .0150 | .1150 |
| ±200 | .0200 | .1150 |

It may be observed from the foregoing Table I that the support wall thickness ranges from .0040 inch wall thickness at ±15 p.s.i.d. (⅕ of diaphragm thickness) to .0200 inch at ±200 p.s.i.d. (equal to diaphragm thickness).

Thus, a simple and economical diaphragm-type differential pressure transducer is provided which utilizes bending rather than linear deformation to determine such pressure. The illustrated exemplary form of transducer has high sensitivity to differential pressure and low sensitivity to line pressures. The diaphragm element is compact, lightweight, simple and clean in configuration for ease and economy of manufacture, assembly and servicing. In particular, the illustrated form of support wall has a plain cylindrical outer or exterior surface which can be machined on a lathe or mill in a single simple operation. Further, the uniformity of the thickness of the diaphragm is less critical than in devices in which the sensors or strain gages are mounted directly on the diaphragm, because in the illustrated device the stress produced is an integration of the effect of the differential pressure over the entire diaphragm. The sensors or strain gages are mounted externally with respect to the pressure chambers, to protect the sensors from the pressure medium, particularly in a "wet-wet" differential pressure application.

Various modifications and changes may be made in the illustrated structure without departing from the spirit and scope of the present invention.

Various features of the present invention are set forth in the following claims.

I claim:
1. For a differential pressure transducer, the combination of:
   (a) pressure responsive means having:
      (1) a flexible diaphragm means and
      (2) a bendable support wall means connected to and supporting said diaphragm means around its periphery, said wall means extending generally transversely to said diaphragm means to to define with said diaphragm means a portion of a pressure chamber at each side of said diaphragm means, said diaphragm means and said wall means proportioned and arranged to have said diaphragm means flex when subjected to a selected range of differential pressure and to cause said wall means to bend to place an outside surface of the wall means immediately adjacent to the higher pressure side of the diaphragm means in measurable compression and to place an outside surface of the wall means immediately adjacent to the lower pressure side of the diaphragm means in measurable tension; and
   (b) sensing means carried on both of said outside surfaces of the wall means for sensing the strain at such surfaces.

2. A combination as defined in claim 1, wherein said pressure responsive means has generally proportionate relative dimensions in the following ranges: a support wall means thickness of from about 0.003 to about 0.020 inch, diaphragm means thickness of from about 0.010 to about 0.060 inch, and diaphragm means diameter of from about 0.5 to about 2.0 inches.

3. A combination as defined in claim 1, wherein said diaphragm means has a thickness of from about 1 to about 5 times the thickness of said wall means.

4. A combination as defined in claim 1, wherein said diaphragm means and said wall means are integrally formed with one another.

5. A combination as defined in claim 1, wherein said wall means is generally tubular and symmetrical about its axis.

6. A combination as defined in claim 1, wherein said diaphragm means is generally symmetrically positioned transversely of said wall means.

7. A combination as defined in claim 1, in further combination with housing means for supporting the element with the diaphragm means and portions of the wall means adjacent the diaphragm means unrestrained so that they can freely move.

8. For use in a differential pressure transducer, a pressure responsive means comprising:
   (a) a flexible diaphragm means adapted to flex when subjected to a differential pressure across both sides of the diaphragm in a selected range; and
   (b) a bendable support wall means connected to and supporting said diaphragm means around its periphery, said wall means extending generally transversely to said diaphragm means on both sides of the diaphragm and with the support wall measurably bent by flexing of said diaphragm means, said support wall means having a generally continuous uninterrupted outer surface extending on both sides of the diaphragm.

9. An element as defined in claim 8, wherein said wall means is generally tubular and symmetrical about its axis.

10. An element as defined in claim 9, wherein said outer surface is generally cylindrical.

11. An element as defined in claim 9, wherein said diaphragm means is symmetrically spaced transversely of said tubular wall means.

12. A differential pressure transducer comprising in combination:
   (a) a casing having an interior cavity;
   (b) a pair of end supports extending into said cavity from either end thereof; each end support having generally cylindrical hub means at its inner end and a pressure port extending from the inner face of the associated hub means to the outside of the end support; the inner ends of said hub means being spaced from one another;
   (c) a pressure-responsive element supported in said cavity by said end supports, said element including a thin tubular wall having each end telescoped on one of said hub means and forming a seal therewith, said element also including a thin flexible diaphragm extending transversely across said wall intermediate said hub means, said element being proportioned and arranged so that a differential pressure in a selected range across said diaphragm will flex said diaphragm to thereby cause measurable bending in said tubular wall; and
   (d) strain sensing means mounted on an outer surface of said tubular wall generally intermediate said hub means.

References Cited

UNITED STATES PATENTS 2,840,675  6/1958  Di Giovanni _____ 338—4
3,269,187  8/1966  Perino _____ 73—398

LOUIS R. PRINCE, *Primary Examiner.*

D. E. CORR, *Assistant Examiner.*

U.S. Cl. X.R.

73—407